United States Patent [19]

Someya et al.

[11] Patent Number: 4,616,916
[45] Date of Patent: Oct. 14, 1986

[54] EXPOSURE CONTROL MODE SELECTING DEVICE FOR CAMERA

[75] Inventors: Hiromi Someya, Kanagawa; Yoshihiko Aihara, Tokyo; Nobuyuki Suzuki; Toyokazu Mizogui, both of Kanagawa, all of Japan

[73] Assignee: Canon Kabushiki Kaisha, Tokyo, Japan

[21] Appl. No.: 722,166

[22] Filed: Apr. 11, 1985

[30] Foreign Application Priority Data

Apr. 13, 1984 [JP] Japan ................................ 59-75385

[51] Int. Cl.$^4$ ........................................... G03B 7/097
[52] U.S. Cl. .................................................. 354/442
[58] Field of Search ............... 354/442, 443, 474, 475, 354/289.1, 289.12

[56] References Cited
U.S. PATENT DOCUMENTS

| 4,358,188 | 11/1982 | Uchidoi et al. | 354/443 |
| 4,525,054 | 6/1985 | Someya et al. | 354/443 |
| 4,529,291 | 7/1985 | Mizogui | 354/443 |

Primary Examiner—William B. Perkey
Attorney, Agent, or Firm—Toren, McGeady, Stanger, Goldberg & Kiel

[57] ABSTRACT

The disclosed invention is a multi-mode automatic exposure control camera which operates with selection of various image effects and enables even the beginner to make photographs with less susceptibility to failure. Upon consideration of different image effects, a plurality of combinations of shutter time and aperture value are provided for one mode, and in the usual mode selection, a more frequently used combination is made preferentially selectable to provide an improved operation.

23 Claims, 5 Drawing Figures

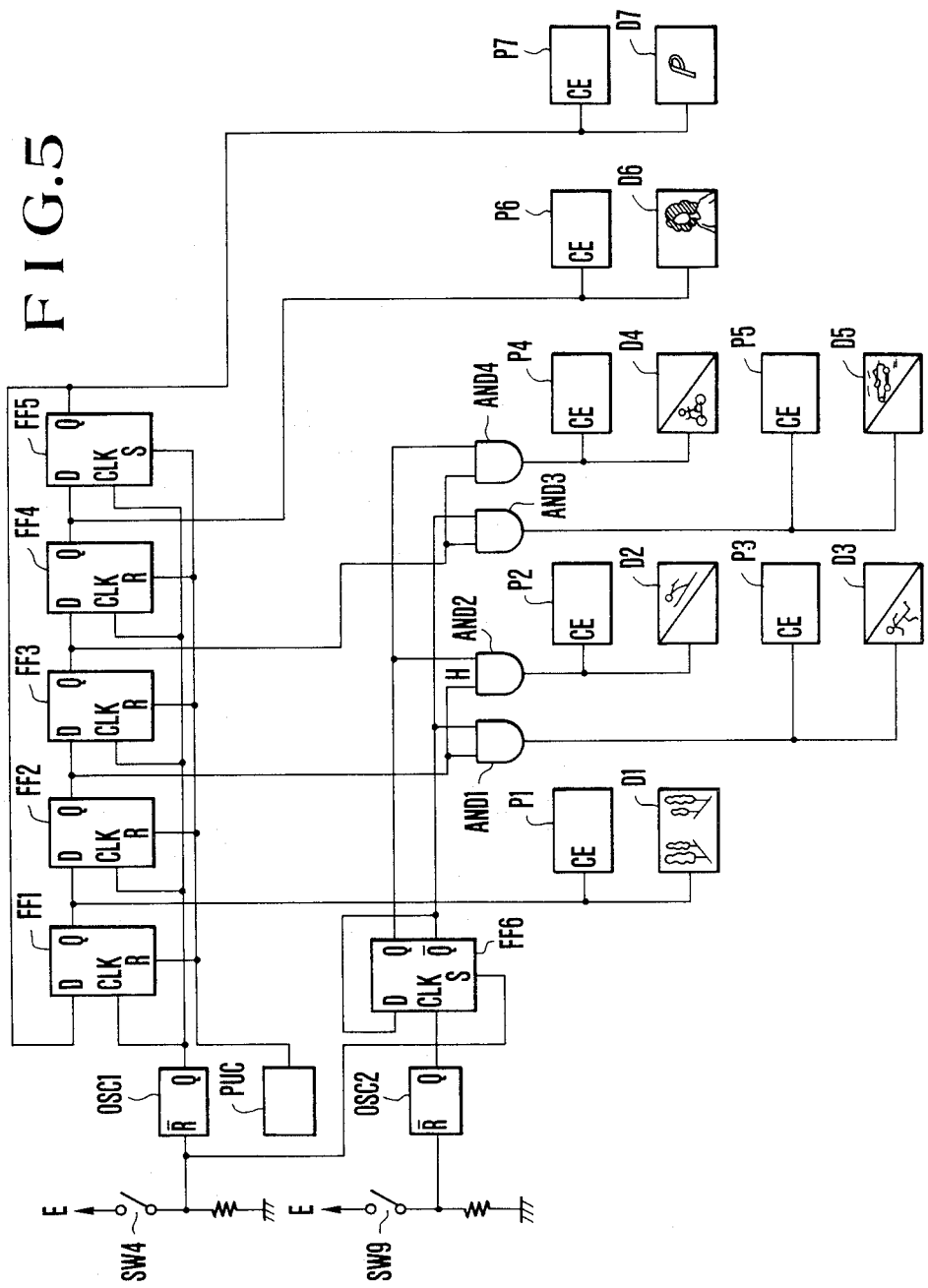

EXPOSURE CONTROL MODE SELECTING DEVICE FOR CAMERA

BACKGROUND OF THE INVENTION

1. Field of the Invention

This invention relates to an exposure control mode selecting device for multi-mode automatic exposure control cameras having various automatic exposure control modes, and more particularly to an exposure control mode selecting device capable of selecting at least one particular program line out of a plurality of program lines concerning combinations of shutter time and aperture values for one mode.

2. Description of the Prior Art

A wide variety of multi-mode automatic exposure control cameras switchable from one of the shutter speed priority, aperture priority and program exposure control modes to another one have been put into practice. In the cameras of this kind it has also been the common practice that the selected one of the exposure control modes is displayed in the form of a letter or symbol. Such discrimination of the display by the letter or symbol is, however, inconvenient when to recognize what it implies. Particularly for the beginner, or the user who does not have the ability to choose appropriate values of shutter speed and aperture for obtaning a desired image effect which differs with different depths of focus or different shutter speeds, or does not yet acquire the knowledge of correlations of aperture value, shutter time, film sensitivity and object brightness, it is very difficult to determine the values of aperture and shutter time in view of the desired image effect. In this respect, despite what mode operates is indicated, the use of letters or symbols in the display does not help such a user in his difficulty of choosing an appropriate combination of shutter time and aperture values while getting a fair insight into what image effect will result. As any image effect will be obtained when the exposure factors have values falling within ranges, these ranges are also not indicated in the conventional cameras of the kind described above. To show an example, if the display of the aperture priority exposure mode is presented by "A" or "Av", for the pan-focus effect is obtained, what aperture value has to be chosen is left unknown. And, in what range of object brightness the pan-focus effect can be obtained is also unknown.

To overcome this, that is to say, in order even for the beginner to make photographs by taking into account the image effect owing to the combination of shutter speed and aperture values, the corresponding combinations of shutter speed and aperture values to the various image effects are previously programmed in the camera and the image effects these programs produce are represented by simple pictorial symbols or pictographs as displayed either within the finder or on the top panel of the camera housing. However, what is merely said of the image effect is not unequivocally defined. So, whatever good a pictograph is cannot always express 100% of the intended image effect, depending on the speed of movement of the object, the distance between the subject of principal interest and the background, and the focal length of the photographic lens. This should be explained in more detail by taking an example of stop motion. For ski competitions, car races, or fast moving objects, faster shutter speeds than 1/500 sec. must be chosen. Otherwise, the image effect of stop motion could not be produced. But, to slow moving objects such as running pupils, 1/250 sec. or less suffices for obtaining the effect of stop motion. Considering the case when the camera is used by the beginner, we hardly expect him to notice the difference in the photographic situation and the focal length of the lens and then to make determination of the most appropriate combination of shutter speed and aperture values. Therefore, we have to find as many combinations of shutter speed and aperture values as possible which are well suited to produce the various image effects and to program them in the camera so that even the beginner can shoot the camera to every photographic situation which may be encountered with the result that the percentage of photographs which will be found unacceptable is greatly reduced. From the point of view of the quick and easy management of the camera, however, if several programs for the same image effect are assigned to one exposure control mode, when to determine which program is most suited to the given photographic situation, the beginner will put into confusion after all. This is the same thing as only one program is assigned to one exposure control mode, namely, the shutter priority or the aperture priority one. The use of this method, therefore, not only increases the difficulty of handling camera, but also makes the user to miss shutter chances with increased possiblity.

SUMMARY OF THE INVENTION

An object of the present invention is to provide a camera which has overcome the above-described drawbacks of the conventional camera.

Another object is to provide a multi-mode automatic exposure camera which enables the user to choose various image effects and with which even the beginner can take photographs of the desired image effect with a low probability that failure will happen.

One of the features of the invention is that upon consideration of an image effect, a plurality of combinations of shutter speed and aperture values are assigned to one exposure mode, and that when in the usual mode selection, the one of the combinations which is very frequently used is made preferentially selectable to provide an improved management.

Other objects and features of the invention will become apparent from the following description of a preferred embodiment thereof.

BRIEF DESCRIPTION OF THE DRAWINGS

FIG. 5 is an electrical circuit diagram of the main parts of the camera of FIG. 1.

DESCRIPTION OF THE PREFERRED EMBODIMENT

Figure 1:
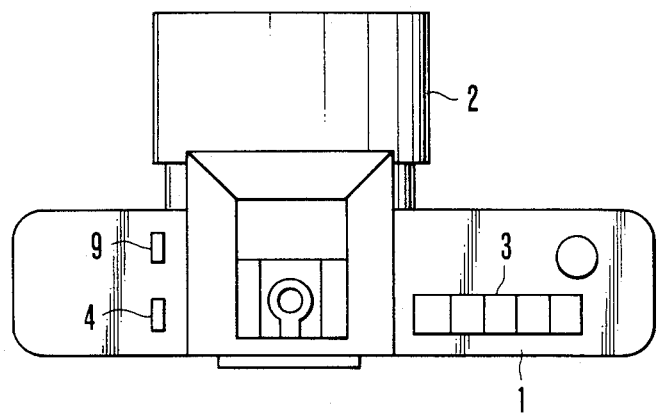
FIG. 1 is a top plan view of an embodiment of the invention.

In FIG. 1 there is shown one embodiment of a camera having an exposure control mode display device according to the present invention. The field of view of the finder of the camera of FIG. 1 is exemplified in FIG. 2. In these drawings, a camera body 1 has a photographic lens 2. An exposure control mode display 3 of liquid crystal or other electrically controlled transmittance is provided in the top panel of the camera housing 1. An exposure control mode selector or button 4 for an exposure control mode changeover switch is on the top panel. Another display 6 made of liquid crystal or electrically controlled transmittance parts is provided just outside of a field frame 5 of the viewfinder of the camera and shows the corresponding informations to those shown in the aforesaid first display 3. A button 9 is provided for altering the degree of effects in one mode, as the shutter speed and aperture change from one value to another.

Figure 3:
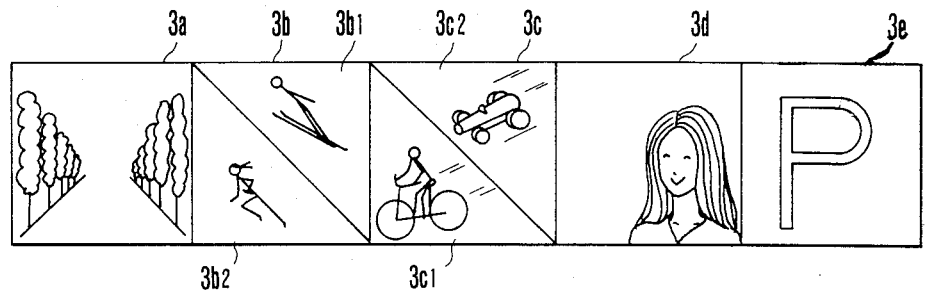
FIG. 3 illustrates an example of a combination of pictographs corresponding to those shown in FIG. 2.

FIG. 3 illustrates an example of different pictographs depicted on the aforesaid exposure control mode display 3. The pictographs 3a, 3b, 3c, 3d and 3e correspond to pictographs 6a, 6b, 6c, 6d and 6e of the aforesaid finder display 6 respectively. The pictograph 3a represents an aperture priority program mode in which an image effect of deep depth of focus can be obtained (hereinafter called "pan-focus program mode"). The pictograph 3b represents a shutter speed priority program mode suited to shoot moving objects (hereinafter called "stop motion program mode") and is comprised of a first FIG. $3b_1$ representing that aspect of the stop motion program mode which is programmed so as to select that value of shutter speed which is high in the frequency of use, and a second FIG. $3b_2$ representing another aspect of the stop motion program mode which is programmed so as to select that value of shutter speed which is low in the frequency of use. The pictograph 3c represents the shutter speed priority program mode also but with slow shutter speeds for use in panning the camera to blur background while showing a fast-moving subject sharply (hereinafter called "panning shot" program mode) and is comprised of a first FIG. $3c_1$ representing that aspect of the panning shot program mode which is programmed so as to select that value of shutter speed which is high in the frequency of use, and a second FIG. $3c_2$ representing another aspect of the panning shot program mode which is programmed so as to select that value of shutter speed which is low in the frequency of use. The pictograph 3d represents the aperture priority mode also but which operates at the full open aperture or thereabout to shallow the depth of focus (hereinafter called "gradate" program mode). 3e is a letter "P" standing for the program mode in which the standard combinations of aperture and shutter speed of high frequency of use are selectively used depending upon the exposure value (hereinafter called "normal" program mode).

Figure 4:
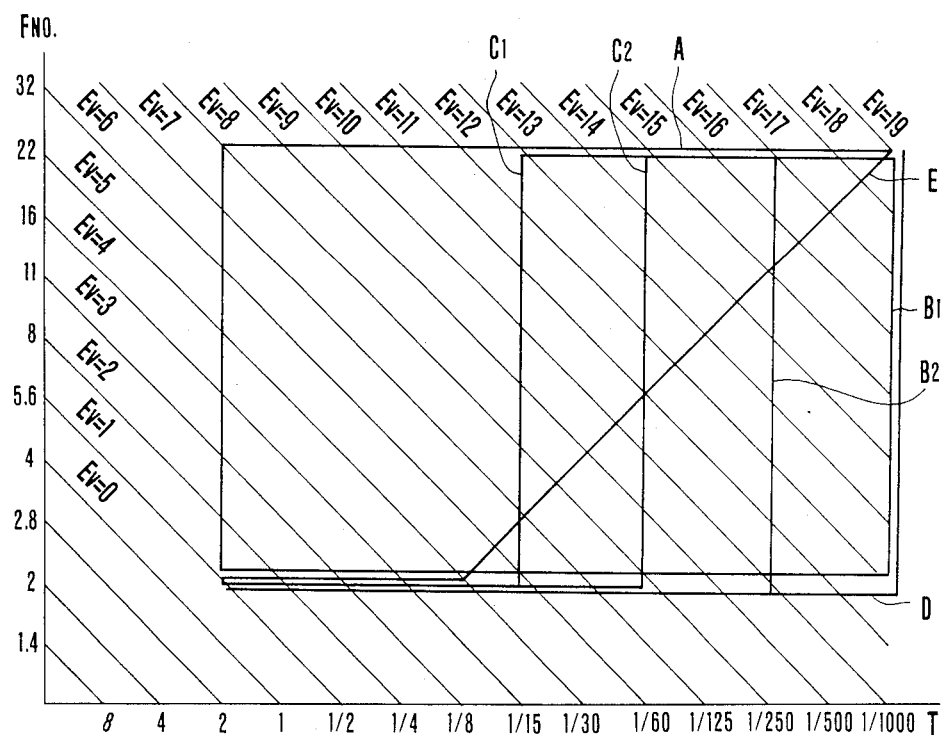
FIG. 4 is a graph of program lines for the camera of FIG. 1.

FIG. 4 in graph illustrates the relationship of the program lines used in one embodiment of the multi-mode automatic exposure control camera according to the invention. In this graph, the ordinate is in F-number (FNo.) and the abscissa is in shutter speed (T) with the parameter in exposure value (Ev) (or light value (Lv) at ASA 100). The program line A is assigned to the pan-focus program mode, so that for a first range of Ev=1 to 8, the shutter speed is set in T=2 and the aperture size in F=2 to 22, and for a second range of Ev=8 to 19, the shutter speed is set in T=2 to 1/1000, and the aperture size in F=22. The program lines B1 and B2 are assigned to the stop motion program mode, so that with the program line $B_1$ of high frequency of use, for a first range of Ev=1 to 12, the shutter speed is set in T=2 to 1/1000 and the aperture size in F=2, and for a second range of Ev=12 to 19, the shutter speed is set in T=1/1000, and the aperture size in F=2 to 22. With the program line B2 of low frequency of use, for a first range of Ev=1 to 10, the shutter speed is set in T=2 to 1/250 and the aperture size in F=2, for a second range of Ev=10 to 17, the shutter speed is set in T=1/250, and the aperture size in F=2 to 22, and for a third range of Ev=17 to 19, the shutter speed is set in T=1/250 to 1/1000, and the aperture size in F=22. The program lines C1 and C2 are assigned to the panning shot program mode so that with the program line of high frequency of use, for a first range of Ev=1 to 6, the shutter speed is set in T=2 to 1/15 and the aperture size in F=2, for a second range of Ev=6 to 13, the shutter speed is set in T=1/15 and the aperture size in F=2 to 22, and for a third range of Ev=13 to 19, the shutter speed is set in T=1/15 to 1/1000, and the aperture size in F=22. The program line D is assigned to the gradate program mode, being similar to the program line B1 of the stop motion program mode. The program line E is assigned to the normal program mode so that for lower exposure values than 5, as the shutter speed varies T=2 to $\frac{1}{8}$ sec., the aperture size is maintained constant at F=2. For higher object brightnesses, the shutter speed and the aperture size vary simultaneously along a line passing through a point (T=$\frac{1}{8}$, F=2) to a point (T=1/1000, F=22).

Figure 2:
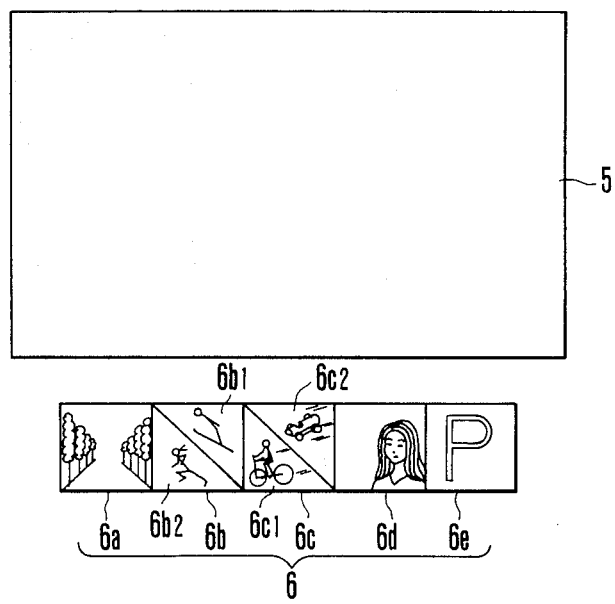
FIG. 2 is a plan view of a practical example of a viewfield in the finder of the camera of FIG. 1.

FIG. 5 is an electrical circuit diagram of a practical example of a drive circuit for the exposure control mode display device of the invention shown in FIGS. 2 and 3. For note, as to the details of the circuitry of the display device, a similar one is disclosed in U.S. patent application Ser. No. 621,494 (filed June 18, 1984) assigned to Canon. Therefore, no more explanation is given here.

A switch SW4 has its one terminal connected to a battery E and is arranged adjacent the exposure control mode selector button 4 of FIG. 1. Another switch SW9 has its one terminal connected to the battery E and is arranged adjacent the mode aspect changeover button 9 of FIG. 1. Two oscillators OSC1 and OSC2 operate in such a manner that so long as a signal of low level appears at the "RESET" input terminal ($\overline{R}$ terminal), a signal of low level is produced from each of their Q output terminals. But when the signal at the $\overline{R}$ terminal changes from low to high level, each of the oscillators OSC1 and OSC2 produces an output signal of high level at the Q terminal. If the signal at the $\overline{R}$ terminal continues being of high level, each of their Q outputs changes between low and high levels, producing a train of pulses.

FF1 to FF6 are D type flip-flops; PUC is a power-up clear circuit responsive to throwing of the battery for producing a pulse of short duration. This pulse is then applied to the R terminals of the D type flip-flops FF1 to FF4 and the S terminal of the D type flip-flop FF5.

P1-P7 are program line selecting circuits similar to those shown in FIG. 6 of the above-identified U.S. patent application Ser. No. 621,494 for determining shutter speed and aperture values on the basis of the exposure value EV when the exposure is controlled. When a signal of high level is applied to one of their CE input terminals, the corresponding one of the program lines A to E of FIG. 4 is selected for use in determining the values of shutter speed and aperture size. For note, the program line A of FIG. 4 is selected by P1, the program line B1 by P2, the program line B2 by P3, the program line C1 by P4, the program line C2 by P5, the program line D by P6 and the program line E by Pt.

AND1–AND4 are AND gates. D1–D7 are display drive circuits. The drive circuit D1 has an output which is connected to display elements $3aa$ (not shown) for the pictograph $6a$ of FIG. 2 and the pictograph $3a$ of FIG. 3. The output of the drive circuit D2 is connected to display elements $3b_{11}$ (not shown) for the pictograph $6b_1$ of FIG. 2 and the pictograph $3b_1$ of FIG. 3. The output of the drive circuit D3 is connected to display elements (not shown) for the pictograph $6b_2$ of FIG. 2 and the pictograph $3b_2$ of FIG. 3. The output of the drive circuit D4 is connected to display elements $3c_{11}$ (not shown) for the pictograph $6c_1$ of FIG. 2 and the pictograph $3c_1$ of FIG. 3. The output of the drive circuit D5 is connected to display elements $3c_{22}$ (not shown) for the pictograph $6c_2$ of FIG. 2 and the pictograph $3c_2$ of FIG. 3. The output of the drive circuit D6 is connected to display elements $3dd$ (not shown) for the pictograph $6d$ of FIG. 2 and the pictograph $3d$ of FIG. 3. The output of the drive circuit D7 is connected to display elements $3ee$ for the pictograph $6e$ of FIG. 2 and the pictograph $3e$ of FIG. 3. For note, the drive circuits D1 to D7 are similar in construction to those shown in FIG. 5 of the above-identified U.S. patent application Ser. No. 621,494.

The operation of the camera of such construction is as follows: When the battery of the camera is thrown by a switch (not shown), the power-up clear circuit PUC produces one pulse of short duration. This pulse is applied to the D type flip-flop FF5 at the S terminal thereof, so the output of the D type flip-flop FF5 is set at a high level. Therefore, the pictographs $3e$ and $6e$ appear in the exposure control mode display 3 and finder display 6 respectively. On the other hand, the Q outputs of the D type flip-flops FF1 to FF4 are set at a low level. These states are retained so long as the exposure control mode selection button 4 is not pushed down.

Next, as the exposure control mode selection button 4 of FIG. 1 is pushed down, when the switch SW4 is turned on once, the oscillator OSC1 produces a pulse of high level which is then applied to the CLK terminals of the D type flip-flops FF1 to FF5. In synchronism with the rising edge of that pulse, the Q output of the D type flip-flop FF5 changes to low, and the Q output of the D type flip-flop FF1 changes to high. Therefore, the exposure control mode display 3 and the finder display 6 present the pictographs $3a$ and $6a$ respectively, while the pictographs $3e$ and $6e$ disappear, thus informing the user that the exposure control mode has changed from the normal program mode to the pan-focus program mode. At this time, the D type flip-flops FF2 to FF4 have their Q outputs maintained at a level. That is, the high signal has shifted from the Q output of the D type flip-flop FF5 to the Q output of the D type flip-flop FF1. As the selection button 4 is pushed down again, when the switch SW4 is turned again from off to on, similarly to the above, the oscillator OSC1 produces a second pulse. Responsive to this, the high signal shifts from the Q output of the D type flip-flop FF1 to the Q output of the D type flip-flop FF2. Therefore, the pictographs $3a$ and $6a$ disappear, and the pictographs $3b_1$ and $6b_1$ appear, informing that the camera has been switched from the pan focus program mode to the stop motion program mode. Subsequently thereto, in the same way, each time the switch SW4 is turned on, only one of the Q outputs of the D type flip-flops FF1 to FF5 becomes high level, and that flip-flop which produces the Q output of high level moves from FF1 to FF5 in sequence and then further returns to FF1. Thus, a similar procedure repeats itself. Therefore, the exposure control mode changes in sequence to the panning shot program mode, gradate program mode, normal program mode, and so on, while the pictographs of the exposure control mode display 3 and finder display 6 also change in sequence. Also if the switch SW4 continues being turned on longer than a certain time, because the Q output of the oscillator OSC1 repeatedly changes over between the high and low levels in a period, the signal of high level at the Q output of flip-flop goes shifting to the following D type flip-flops FF1→FF2→FF3→FF4→FF5→FF1 and so on in equal time intervals successively. Responsive to this the exposure control mode, the exposure control mode display and finder display change in sequence.

Next, after the pictograph $6b_1$ of FIG. 2 and the pictograph $3b_1$ of FIG. 3 have appeared, or after the usual mode of the stop motion program has been set by operating the exposure control mode selection button 4, when the effect degree changeover button 9 of FIG. 1 is actuated, the circuit operates in the following manner. When the effect degree changeover switch 9 is pushed down, the switch SW9 is turned from off to on, thereby repetitive pulses begining at high level are produced from the Q output terminal of the oscillator OSC2. The Q output of the oscillator OSC2 is applied to the CLK terminal of the D type flip-flop FF6. But, because the D type flip-flop FF6 has its $\overline{Q}$ output connected its D input terminal to form a so-called toggle circuit, each time one rising signal enters the CLK input terminal, the levels of the Q and $\overline{Q}$ outputs of the flip-flop FF6 are inverted. Now, when the switch SW9 is turned from off to on, a rising signal enters the CLK input terminal of the D type flip-flop FF6 as mentioned, so the Q output of the D type flip-flop FF6 is changed from high to low, and its $\overline{Q}$ output is changed from low to high. Therefore, the AND gate AND1 whose two inputs are connected to the $\overline{Q}$ output of the D type flip-flop FF6 and the Q output of the D type flip-flop FF2 changes its output to high. Thus, the program line selection circuit P3 whose input is connected to the output of the AND gate AND1 is rendered operative to select the program line B2 of FIG. 4. Similarly, the drive circuit D3 whose input is connected to the output of the AND gate AND1 is also rendered operative so that the pictograph $3b_2$ of FIG. 3 and the pictograph $6b_2$ of FIG. 6 appear on the exposure control mode display 3 and the finder display 6 respectively.

Meanwhile, because the Q output of the D type flip-flop FF6 is connected to one of the inputs of the AND gate AND2, the output of the AND gate AND2 changes to low level. Therefore, the program line selection circuit P2 whose input is connected to the output of the AND gate AND2 is rendered inoperative. Similarly, the display drive circuit D2 whose input is connected to the output of the AND gate AND2 is also rendered inoperative. As a result, the photographer can know that though the mode selected for now is the stop motion program mode, the usual mode of high frequency of use has switched to the unusual mode of low frequency of use.

Then, when the effect degree changeover button 9 is once more pushed down to turn on the switch SW9, the oscillator OSC2 produces a pulse. Responsive to this pulse, the D type flip-flop FF6 inverts its Q and $\overline{Q}$ outputs, thereby the program line selection circuit P2 is rendered operative again. On the other hand, the program line selection circuit P3 which has so far been selected is rendered inoperative again, and the display drive circuit D3 is rendered inoperative again.

Like this, each time the switch SW9 is turned on, the operation and the inoperation change over between the combination of the program line selection circuit P2 and display drive circuit D2 and the combination of the program line selection circuit P3 and the display drive circuit D3. Therefore, the stop motion program mode changes over between the usual mode and the unusual mode.

Also, when the switch SW9 continues being turned on longer than a prescribed time, because the Q output of the oscillator OSC2 repeats the change between the high and low levels in a period, even the continuance of closure of the switch SW9 results in alternative setting of the usual and unusual modes of the stop motion program in the prescribed period.

When the effect degree alterrng button 9 is released from depression, as the switch SW9 turns off, the oscillator OSC2 is reset so that the one of the aforesaid two modes which was operating at the time when the switch SW9 was turned off continues to be as selected.

Now, to switch the camera from this state to the panning shot program mode, the switch SW4 is then turned on again, so the high signal is applied to the S terminal of the D type flip-flop FF6. Therefore, regardless of whether the D type flip-flop FF6 is in the set state or in the reset state, it is forced to be set so that a signal of high level is produced at the Q output of the D type flip-flop FF6, and another signal of low level at the $\bar{Q}$ output of the D type flip-flop FF6. Of the group of the D type flip-flops FF1 to FF5, only the flip-flop FF3 produces a high signal at its Q output. Therefore, the AND gate AND4 whose two inputs are connected to the Q output of the D type flip-flop FF3 and the Q output of the D type flip-flop FF6 changes its output to a high level. As a result, the program line selection circuit P4 is selected and the program line C1 of FIG. 4 is selected. Similarly, the display drive circuit D4 of which the input is also connected to the output of the AND gate AND4 is rendered operative to produce appearance of the pictograph $3c_1$ of FIG. 3 and the pictograph $6c_1$ of FIG. 2 on the exposure control mode display 3 and the finder display 6 respectively, thereby informing the photographer that the usual mode of the panning shot program is being selected.

In this state, when the effect degree altering button 9 is pushed down, and, therefore, when the switch SW9 is operated, the circuit operates in a manner similar to that described in connection with the alternative setting operation of the usual and unusual modes of the stop motion program. Therefore, a detailed explanation is omitted.

By turning on the switch SW9 for a short time, the setting and resetting states of the D type flip-flop FF6 are changed over. Therefore, the Q output of the D type flip-flop FF6 produces a signal of low level, and the $\bar{Q}$ output produces a signal of high level. Because the input terminals of the AND gate AND3 both become high, the AND gate AND3 produces a signal of high level. As a result, the program line selection circuit P5 of which the input is connected to the output of the AND gate AND3 is selected, so that the program line C2 of FIG. 4 is selected. Similarly, the display drive circuit D5 of which the input is also connected to the output of the AND gate AND3 is rendered operative to show of the pictograph $3c_2$ of FIG. 3 and the pictograph $6c_2$ of FIG. 2 on the exposure control mode display 3 and the finder display 6 respectively. This informs the photographer that the unusual mode of the panning shot program is being selected. After that, each time the switch SW9 is turned on, similarly to the case of the stop motion program mode, the panning shot program mode change over between the usual and unusual modes. Also when the switch SW9 continues to be as turned on longer than a prescribed time, similarly to the case of selection of the stop motion program mode, the settings of the usual mode and the unusual mode alternate in a prescribed period. Further when the switch SW9 is turned off, the one of the two modes which was operating at that time is allowed to continue being selected.

From this state, when the exposure control mode selecting button 4 is pushed down again, and, therefore, when the switch SW4 is turned on, the circuit operates in the following manner. For a short time the switch SW4, is turned on because the D type flip-flop FF4 is set, the program line selection circuit P6 is rendered operative to select the program line D of FIG. 4. Also the drive circuit D6 operates so that the pictograph $3d$ of FIG. 3 and the pictograph $6d$ of FIG. 2 appear on the exposure control mode display 3 and the finder display 6. This informs the photographer that for now the gradate program mode is selected. Then, when the switch SW4 is once more pushed down for a short time, the program line selection circuit P7 is selected again, thus regaining the initial state when the battery was thrown.

After a desired exposure mode has been set in such a manner, when shutter release button (not shown) of the camera is pushed down, a program exposure is carried out in the known way with the corresponding shutter speed and aperture values to the selected exposure mode.

Since constructed as such, the photographer while looking at the displayed pictograph can freely select a desired one of the various modes, namely, the normal program mode, pan-focus program mode, stop motion program mode, panning shot program mode and gradate program mode by operating the exposure control mode selector or button 4. Moreover, when the stop motion program mode or the panning shot program mode is selected, the camera automatically selects the program line of high frequency of use preferentially. According to the invention, therefore, the photographer is released from the trouble due to the availability of two aspects for one mode, and can shoot the camera with a greatly reduced possibility of missing good shutter chances.

What is claimed is:

1. A photographic mode setting device for a camera which can set a plurality of photographic modes constituting a first group and a plurality of photographic modes different from said first group and forms pictograph displays corresponding to each one of said set photographic modes, comprising:
    (a) a first operating member for setting a desired one of the photographic modes of said first group;
    (b) a designating circuit for selectively designating the photographic mode of the first group set by said first operating member;
    (c) a selection circuit for permitting designation of a mode different from the first group only when a specific photographic mode out of said first group has been selected; and (d) a second operating member for causing said selection circuit to perform a selecting action of said different photographic mode from the first group only under when said certain specific photographic mode of the first group has been selected;

whereby setting of a mode by the second operating member does not occur when said certain specific photographic mode is not set by said first operating member, but only when said certain specific photographic mode is selected setting of the certain specific mode by operating the second operating member.

2. A photographic mode setting device for a camera having a plurality of different program photographic modes constituting a first group and other photographic modes constituting a second group which includes a certain specific program mode of said first group and include different program photographic modes from the first group as modes other than said certain specific program mode, comprising:
(a) a first operating member;
(b) a mode designating circuit for designating any desired program photographic mode of the first group by an operation of said first operating member;
(c) a second operating member; and
(d) a selection circuit for selecting any mode desired out of said second group only when said, certain specific program mode is designated out of said first group by said mode designating circuit;

whereby the selection circuit selects a mode out of the second group in response to an operation of the second operating member only when said certain specific program mode has been designated.

3. A photographic mode setting device according to claim 2, wherein said designating circuit of the mode setting device designates a prescribed program photograph mode of the first group in response to actuation by a power source.

4. A photographic mode setting device according to claim 3, wherein the programs in said first group includes a program for obtaining a diaphragm effect and a program for obtaining a shutter effect.

5. A photographic mode setting device according to claim 4, wherein the programs in said second group includes a program for obtaining a different shutter effect.

6. A photographic mode setting device according to claim 5, wherein said certain specific program is the one which allows a photo-taking with the fastest shutter time.

7. A photographic mode setting device for a camera comprising:
first circuit means for setting a plurality of first photographic modes;
second circuit means for setting a second photographic mode;
first selector means responsive to actuation by an operator for selecting one of the mode of said first circuit means to be set by said first circuit means;
second selector means responsive to actuation by an operator for selecting the mode of said second circuit means; and
inhibiting means responsive to said first selector means for permitting said second selector means to select the mode of said second circuit means only when said first selector means has selected a predetermined one of the modes within the plurality of first modes.

8. A device as in claim 7, wherein:
said second circuit means serves for setting a plurality of modes and the number of first modes is greater than the number of second modes, and each of said second modes is associated with a different one of said first modes; and
said inhibiting means is arranged to permit the second selection means to select a second mode only when the associated one of the first modes is selected by said first selector means.

9. A device as in claim 7, wherein:
said inhibiting means couples said first selector means to said first circuit means, said second selector means to said second circuit means, and said first and second selector means to each other.

10. A device as in claim 8, wherein:
said inhibiting means couples said first selector means to said first circuit means, said second selector means to said second circuit means, and said first and second selector means to each other.

11. A device as in claim 8, wherein said first modes are a pan-focus mode, a stop motion program mode, a panning program mode, and a gradate program mode and said second modes are a second stop motion program made and a second panning program mode.

12. A photographic mode setting device for a camera, comprising:
first circuit means including a plurality of first circuits each for setting a photographic mode;
second circuit means including a second circuit for setting a photographic mode;
first selector means for selecting one of said first circuits;
second selection means for selecting one of said second circuit;
inhibiting means responsive to said first selector means for permitting said second selector means to select said second circuit only when said first selector means has selected a predetermined one of said first circuits.

13. A device as in claim 12, wherein said second circuit means includes a plurality of second circuits and the number of first circuits is greater than the number of second circuits and each of said second circuits is associated with a different one of said first circuits; and
said inhibiting means is arranged to permit said second selector means to select one of said second circuits only if said first selector means has selected the first circuit associated with the second circuit to be selected.

14. A device as in claim 12, wherein said inhibiting means couples the first circuits associated with the second circuits, and the first selector means with the second selector means.

15. A device as in claim 13, wherein said first modes are a pan-focus mode, a stop motion program mode, a panning program mode, and a gradate program mode and said second modes are a second stop motion program mode and a second panning program mode.

16. A camera comprising:
a lens;
an iris optically coupled to said lens;
a shutter optically arranged relative to said lens;
a first circuit means for setting said iris and said shutter in a plurality of first modes;

second circuit means for setting said iris and said shutter in a plurality of second modes;

first selector means responsive to actuation by an operator for selecting one of the modes to be set by said first circuit means;

second selector means responsive to actuation by an operator for selecting the mode of said second circuit means; and inhibiting means responsive to said first selector means for permitting said second selector means to select the mode of said second circuit means only when said first selector means has selected a predetermined number of modes within the plurality of first modes.

17. A camera as in claim 16, wherein the number of first modes is greater than the number of second modes and each of said second modes is associated with one of said first modes; and said inhibiting means serves to permit the second selection means to select a second mode only when the associated one of the first modes is selected by said first selector means.

18. A device as in claim 16, wherein:

said inhibiting means couples said first selector means to said first circuit means, said second selector means to said second circuit means, and said first and second selector means to each other.

19. A device as in claim 16, wherein said first modes are a pan-focus mode, a stop motion program mode, a panning program mode, and a gradate program mode and said second modes are a second stop motion program made and a second panning program mode.

20. A camera, comprising:

a lens;

an iris optically coupled to said lens;

a shutter;

a plurality of first circuits each for setting said iris and said shutter in a photographic mode;

a plurality of second circuits each for setting said iris and said shutter in a photographic mode;

first selector means for selecting one of said first circuits;

second selection means for selecting one of said second circuits; and inhibiting means responsive to said first selector means for permitting said second selector means to select one of said second circuits only when said first selector means has selected predetermined ones of said first circuits.

21. A camera as in claim 20, wherein the number of first circuits is greater than the number of second circuits and each of said second circuits is associated with one of said first circuits; and said inhibiting means serves to permit said second selector means to select one of said second circuits only if said first selector means has selected a first circuit associated with the selected second circuit.

22. A camera as in claim 20, wherein said inhibiting means couples the first circuits associated with the second circuits, and the first selector means with the second selector means.

23. A camera as in claim 20, wherein said first modes are a pan-focus mode, a stop motion program mode, a panning program mode, and a gradate program mode and said second modes are a second stop motion program made and a second panning program mode.

* * * * *